United States Patent
Gorin

(10) Patent No.: US 6,837,922 B2
(45) Date of Patent: Jan. 4, 2005

(54) AIR FILTER SENSOR APPARATUS KIT AND METHOD

(76) Inventor: Barney F. Gorin, 465 Golden Ash Mews, Gaithersburg, MD (US) 20878

(*) Notice: Subject to any disclaimer, the term of this patent is extended or adjusted under 35 U.S.C. 154(b) by 0 days.

(21) Appl. No.: 10/392,943

(22) Filed: Mar. 21, 2003

(65) Prior Publication Data
US 2004/0182245 A1 Sep. 23, 2004

(51) Int. Cl.[7] .............................................. B01D 35/143
(52) U.S. Cl. ................. 96/419; 96/421; 55/DIG. 34; 116/70; 116/112; 116/276; 116/137 R; 116/DIG. 42; 210/90
(58) Field of Search ............... 96/419, 421; 55/DIG. 34; 116/70, 112, 276, 137 R, DIG. 42; 210/90

(56) References Cited

U.S. PATENT DOCUMENTS

| | | | | |
|---|---|---|---|---|
| 2,753,831 A | * | 7/1956 | Davies ...................... | 116/112 |
| 2,804,839 A | * | 9/1957 | Hallinan .................. | 116/112 |
| 3,934,238 A | * | 1/1976 | Pavlou ..................... | 340/611 |
| 4,321,070 A | * | 3/1982 | Bede ........................ | 96/419 |
| 5,057,821 A | * | 10/1991 | Card ......................... | 340/610 |
| 5,718,822 A | * | 2/1998 | Richter ..................... | 210/90 |
| 5,917,141 A | * | 6/1999 | Naquin, Jr. ................ | 96/417 |
| 6,096,224 A | * | 8/2000 | Champie ................... | 210/741 |

* cited by examiner

Primary Examiner—Minh-Chau T. Pham
(74) Attorney, Agent, or Firm—Michael W. York

(57) ABSTRACT

An air filter sensor kit and method of using the same for permitting a person to modify the filtering portion of a heating or cooling system that uses an air filter to enable the determination of when the air filter is dirty and needs changing. The air filter sensor kit includes an air filter sensor with a portion shaped for insertion through the air filter and a portion with an indicator for indicating the condition of the air filter. The kit includes an air filter sensor connecting and support member for connecting the air filter sensor to an air filter grill and for supporting the air filter sensor and a cutting tool for cutting a hole in an air filter grill to allow the passage of a portion of the air filter sensor connecting and support member to permit a portion of the air filter sensor to be inserted through the air filter. The air filter sensor kit also includes a cutting tool guide that is adjustable to conform to various configurations of air filter grills.

20 Claims, 3 Drawing Sheets

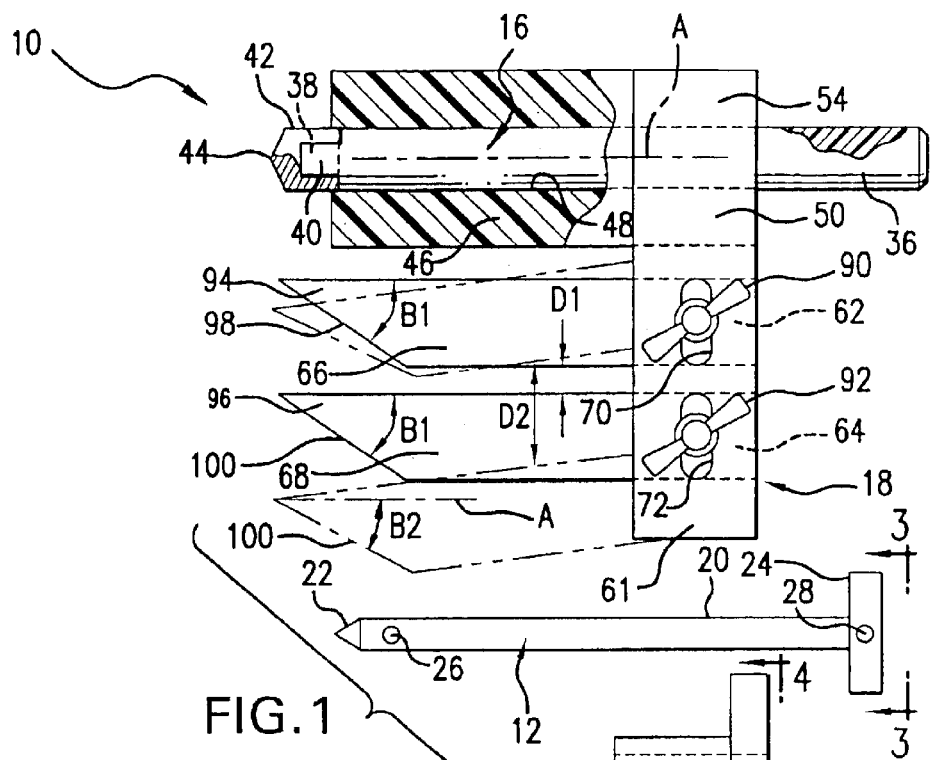
FIG.1
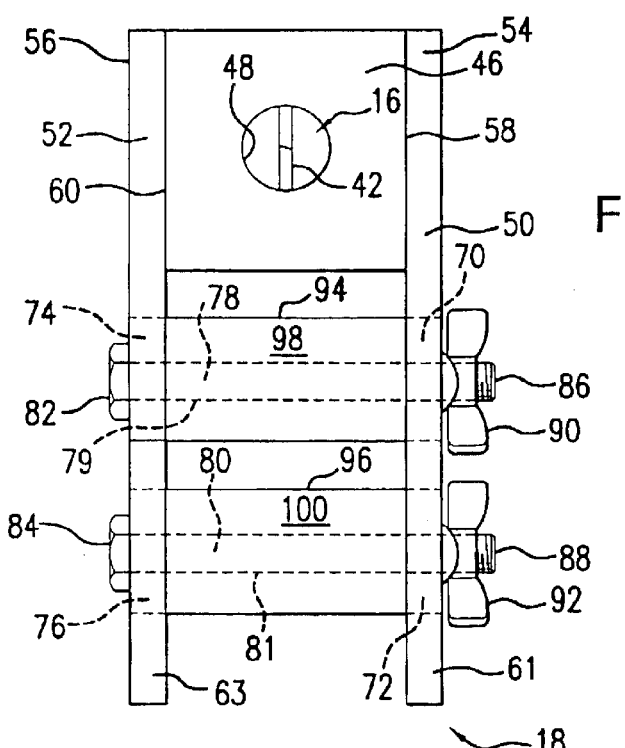
FIG.2
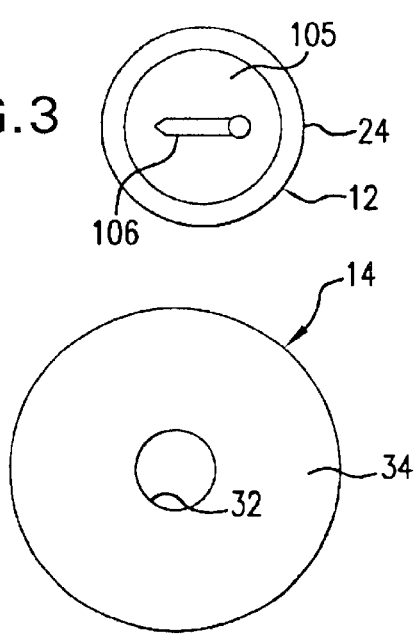
FIG.3
FIG.4

AIR FILTER SENSOR APPARATUS KIT AND METHOD

BACKGROUND OF THE INVENTION

Heating and cooling systems for houses and other dwellings and for at least some commercial establishments include a system for transmitting heated or cooled air throughout the dwelling or commercial establishment. These systems for transmitting heated or cooled air also include filtration equipment for removing particulate matter from the heated or cooled air and this filtration equipment, particularly for dwellings, normally includes one or more mechanical filters formed from fibrous materials.

These filter materials serve the function of mechanically blocking particulate matter that is in the air flowing in circuitous paths through the filter material. The particulate matter becomes attached to individual fibers and, over a period of time, progressively restricts the air flow paths. The difference in pressure between the inflow and outflow sides of the air filter increases as a function of the quantity and size of particulate matter trapped and retained by the filter. This trapped particulate matter simultaneously causes a reduction of the air flow rate through the filter.

This reduced air flow rate reduces the efficiency of the heating or cooling system and the effective heating or cooling of the dwelling or commercial establishment. The partially clogged filter also causes increased back pressure to be applied to the blower or fan which generates the air flow and this back pressure increases the work that must be performed and the energy consumed by the blower or fan unit. The resulting increased load increases the wear rate of the moving parts in the heating or cooling system and also results in increased operating costs. In view of these undesirable effects, it is important that partially clogged or dirty air filters be promptly replaced.

In order to determine when an air filter needs to be changed, a person normally must gain access to the filter. The filter must then be removed and visually inspected. If it is evident through this visual inspection that there is a significant build up of particulate matter on the outside surface of the air filter it is usually replaced with a new filter. This procedure has various deficiencies. This procedure means that the air filter must be periodically checked in order to determine when the filter needs to be changed. This is time consuming and can often result in dirty filters not being changed on time due to the failure to remember to check the filter. Also, the mere visual inspection of the air filter does not in many cases result in an accurate determination if the filter needs to be replaced. In this connection, one person may believe the filter is dirty but the next person may believe it is fine. The mere visual inspection of the surface of the filter is not that reliable in determining the condition of the filter because visual surface contamination or the lack of visual surface contamination may not be representative of contamination plugging microscopic flow paths inside the filter material.

In view of these problems, various devices have been developed over the years to determine when an air filter is dirty and needs replacement and to provide an indication of the need for replacement of an air filter in an heating and air conditioning system. Examples of such devices are set forth in U.S. Pat. Nos. 2,753,831 and 4,321,070 that describe a device with a tube which extends through an air filter and incorporates a whistle. In these devices, air flows continuously through a tube and as the air flow through the tube increases as a result of increasing clogging of the surrounding air filter, the whistle generates a sound when the air flow rate is of a sufficient magnitude. These devices have potential problems since contamination and clogging of the tube may occur and may have a negative effect upon the operation of the whistle. U.S. Pat. No. 2,804,839 discloses a device for providing a visual and audible signal indicative of the clogging of an air filter. The device uses a magnet for retaining a pivotable member in place that provides a visually perceivable indication and actuates further structure capable of energizing an audible alarm. All of these devices are difficult to install and require at least some support from the air filter itself which is undesirable since it can distort and damage the air filter.

These problems are overcome with the present air filter sensor apparatus kit that permits an air filter sensor to be easily installed to eliminate the need for actual inspection of the filter to determine when it is becoming clogged and needs to be replaced. This means that clogged or dirty air filters are more likely to be replaced on time. Moreover, the air filter sensor is supported by the air filter grill and not by the air filter and hence possible air filter damage is eliminated.

SUMMARY OF THE INVENTION

This invention relates to air flow filters and more particularly to sensors for air flow filters.

Accordingly, it is an object of the invention to provide an air filter sensor apparatus kit and method that eliminate the need to periodically visually check heating and cooling air filters.

It is an object of the invention to provide an air filter sensor apparatus kit and method that can be used with a wide variety of types and sizes of heating and cooling air filters.

It is an object of the invention to provide an air filter sensor apparatus kit and method that provide an air filter status indicator in a visible location.

It is an object of the invention to provide an air filter sensor apparatus kit and method that provide an air filter status indicator that is located in plain sight of the occupants of a dwelling.

It is an object of the invention to provide an air filter sensor apparatus kit and method that do not use the air filter to support a sensor.

It is an object of the invention to provide an air filter sensor apparatus kit and method that use an existing air duct grill to support a sensor.

It is an object of the invention to provide an air filter sensor apparatus kit and method that can be used with a variety of air duct grills.

It is an object of the invention to provide an air filter sensor apparatus kit and method that has an air duct grill drilling guide that can be used with different shaped air duct grills.

It is an object of the invention to provide an air filter sensor apparatus kit and method that has an air duct grill drilling guide that is adapted to conform to the shape of various air duct grills.

It is an object of the invention to provide an air filter sensor apparatus kit that includes all items that are required for installation.

It is an object of the invention to provide an air filter sensor apparatus kit that permits a dwelling occupant to easily install the air filter sensor apparatus.

It is an object of the invention to provide an air filter sensor apparatus kit and method that do not require the removal of the air filter.

It is an object of the invention to provide an air filter sensor apparatus kit and method that do not require the removal of any structure associated with the air filter.

It is an object of the invention to provide an air filter sensor apparatus kit and method that permit the easy removal of the air filter sensor apparatus.

It is an object of the invention to provide an air filter sensor apparatus kit and method that permit the easy removal of the air filter sensor apparatus without removing the air filter.

It is an object of the invention to provide an air filter sensor apparatus kit and method that permit the easy removal of the air filter sensor apparatus without removing any structure associated with the air filter.

It is an object of the invention to provide an air filter sensor apparatus kit and method that are specifically designed for easy use by a home owner.

It is an object of the invention to provide an air filter sensor apparatus kit that is simple in its operation.

It is an object of the invention to provide an air filter sensor apparatus kit that is reliable in its operation.

It is an object of the invention to provide an air filter sensor apparatus kit that is easy to manufacture.

It is an object of the invention to provide an air filter sensor apparatus kit that normally requires no service.

These and other objects of the invention will become apparent from the following described air filter sensor apparatus kit and method that includes an air filter sensor for sensing differential air pressure caused by the air filter. The air filter sensor or probe is a generally elongated cylindrical member that is sized and shaped with a pointed end portion to be easily inserted through an air filter. The air filter sensor has an indicator for providing an indication of the differential air pressure sensed by the air filter sensor. The air filter sensor apparatus kit also includes air filter sensor connecting and support means for connecting and supporting the indicator end of the air filter sensor in the air filter grill. The air filter sensor apparatus kit also includes a cutting tool and a cutting tool guide and positioner for cutting a hole in an air filter grill to permit the passage of a portion of the air filter sensor connecting and support means and a portion of the air filter sensor through the grill.

The method includes providing an air filter, an air filter sensor with an indicator, an air filter grill cutting tool and a cutting tool guide and positioner and connecting and support means for connecting and supporting the air filter sensor in an air filter grill. The method also includes cutting a hole in the air filter grill using the air filter grill cutting tool and the cutting tool guide and positioner, inserting a portion of the connecting and support means and the air filter sensor into the hole that has been cut in the air filter grill with a portion of the air filter sensor being inserted through the air filter. The method also includes monitoring the indicator periodically and changing the air filter when the indicator provides an indication that the air filter needs to be changed. During the step of changing the air filter, the air filter sensor is removed from the air filter that is dirty and is being changed and is inserted into the new clean replacement air filter. During the step of changing the dirty air filter, the grill will normally be removed as well as the connected sensor. Then the grill will be replaced and the air filter sensor inserted into the air filter grill.

BRIEF DESCRIPTION OF THE DRAWINGS

The invention will be hereinafter more fully described with reference to the accompanying drawings in which:

FIG. 1 is a side elevational view of the air filter sensor apparatus kit invention;

FIG. 2 is a front elevational view of a cutting tool and cutting tool guide and positioner that forms part of the air filter sensor apparatus kit set forth in FIG. 1;

FIG. 3 is an end elevational view of an air filter sensor that forms part of the sensor apparatus kit set forth in FIG. 1;

FIG. 4 is an end elevational view of an air filter sensor connecting and support member that forms part of the sensor apparatus kit set forth in FIG. 1;

DETAILED DESCRIPTION OF THE PREFERRED EMBODIMENT

Figure 5:
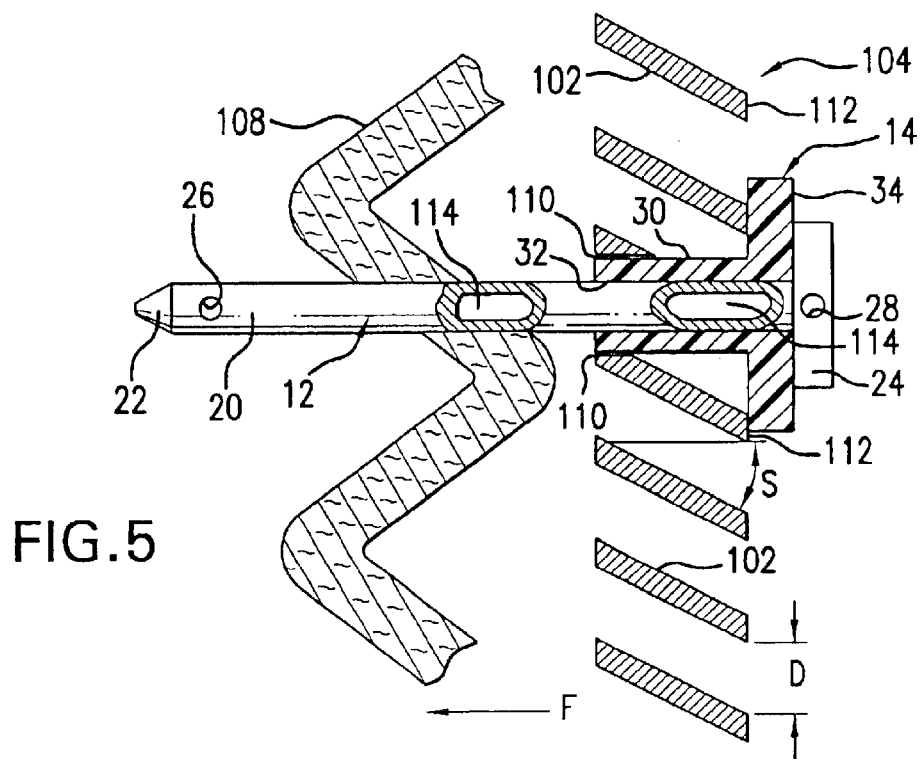
FIG. 5 is a side elevational view of the air filter sensor of the air filter sensor apparatus kit invention installed in an air filter grill and an air filter with certain portions thereof broken away.

Referring first to FIG. 1, the air filter sensor apparatus kit is illustrated and is designated generally by the number 10. The air filter sensor apparatus kit 10 comprises an air filter sensor 12, an air filter sensor connecting and support member 14, an air filter grill cutting tool 16, and an air filter grill cutting tool guide 18.

The air filter sensor 12 has an elongated hollow slender tubular portion 20 with a sharp point 22 on one end and an enlarged circular disk shaped indicator head portion 24 on the other end. The elongated hollow slender tubular portion 20 has a vent hole 26 in its side wall near the pointed end 22 and another atmospheric reference vent hole 28 is located in the side of the enlarged indicator head portion 24. The air filter sensor connecting and support member 14 comprises cylindrical support means comprising a resilient flexible member having a circular cross section insert portion 30 having a centrally located circular cross section hole 32 that is sized and shaped to receive and lightly grip the slender tubular portion 20 of the air filter sensor 12. An enlarged disk shaped stop portion 34 is located at one end of the cylindrical insert portion 30.

As illustrated in FIGS. 1 and 2, the air filter grill cutting tool 16 comprises an elongated circular cross section cylindrical hard plastic member 36 that has a slot 38 in its inner end portion 40 that is sized and shaped to receive and hold a flat tool steel cutting head 42 that has an outward extending point 44.

Also, as illustrated in FIGS. 1 and 2 the air filter tool cutting tool guide 18 comprises an elongated rectangular shaped guide member 46 that has a circular shaped guide hole 48 through it along its long axis A that is sized and shaped to slidably receive the cutting tool 16 with its elongated member 36 and its cutting head 42. The tool cutting guide 18 also has two spaced apart elongated rectangular thin positioning members 50 and 52 whose respective end portions 54 and 56 are rigidly secured to the respective side portions 58 and 60 of the guide block 46. The portions 61 and 63 of the positioning members 50 and 52 that are not attached to the guide member 46 are located parallel to each other and form a gap to receive the respective end portions 62 and 64 of identical generally rectangular guide members 66 and 68.

Each positioning member 50 and 52 has two elongated respective slots 70 and 72 and 74 and 76 located in their portions 61 and 63. These elongated slots 70 and 72 and 74 and 76 receive portions of the respective identical bolts 78 and 80 that pass through and are secured to the end portions 62 and 64 of the respective guide members 66 and 68. These bolts 78 and 80 have respective enlarged head portions 82 and 84 at one end and respective threaded portions 86 and 88 at the other end that are threaded to receive identical wing nuts 90 and 92 that are used to clamp the guide members 66 and 68 between the positioning members 50 and 52.

It will be noted, particularly in FIG. 1, that the guide members 66 and 68 each have pointed end portions 94 and 96 that have respective forward sloping surfaces 98 and 100. These pointed end portions 94 and 96 and their associated surfaces 98 and 100 are placed against the louvers 102 of an air filter grill 104 that is illustrated in FIG. 5 to position the air filter grill cutting tool guide 18. Since the spacing or distance D between the louvers 102 may be different with different air filter grills 104 and since the angle S of the outer surface of the louvers 102 may be different, the air filter grill cutting tool guide 18 has means for adjusting to these differences in spacing D and the difference in the outer surface angles S of the louvers 102.

This means for adjusting to the differences in spacing D of the louvers 102 and the differences in the outer surface angles S of the louvers comprises the bolts 78 and 80, the elongated slots 70 and 72, and 74 and 76, and the wing nuts 90 and 92 as well as the movable guide members 66 and 68 and their sloping surfaces 98 and 100. In this connection, as illustrated in FIG. 1, by loosening the wing nuts 90 and 92 the guide members 66 and 68 can be spread apart to change the distance D1 between the guide members 66 and 68 as illustrated in dashed lines in FIG. 1 where the distance has been changed from D1 to a greater distance D2. As also illustrated in FIG. 1, the angle that the surface surface 98 or 100 makes with the long axis A of the cutting tool guide hole 48 can be changed from B1 to B2 as illustrated by the surface 100 in dashed lines. This is possible since the guide members 66 and 68 can be rotated by loosening the wing nuts 90 and 92 as well as spreading them apart. When the guide members are in the desired position for the particular air filter grill 104 and its louvers 102 the wing nuts 90 and 92 would be tightened by hand.

If it is desired due to space limitations or due to a particular air filter grill 104 configuration, the guide members 66 and 68 can be inverted, so that the sloping surfaces 98 and 100 face upward as viewed in FIG. 1, by removing the wing nuts 90 and 92 and removing the associated bolts 78 and 80. The guide members 66 and 68 are then removed from between the positioning members 50 and 52 and then inverted. The bolts 78 and 80 are then reinserted through the holes 79 and 81 in the guide members 66 and 68 (see FIG. 2) and through the appropriate slots 70 and 72 in the positioning members 50 and 52 and the wing nuts 90 and 92 are replaced and tightened.

Additional flexibility can also be incorporated into the guide members 66 and 68 by providing the holes 97 and 99 illustrated in FIG. 1 in the opposite end of the guide members 66 and 68 from the holes 79 and 81 that normally receive the respective bolts 78 and 80. This will allow the guide members 66 and 68 to be flipped from their positions illustrated in FIG. 1 so that the respective blunt ends 101 and 103 of the guide members 66 an 68 can be pressed against the louvers 102 of the air filter grill 104. These holes 79 and 81 also allow the guide members 66 an 68, after the bolts 78 and 80 have been removed, to be rotated 180 degrees from their positions illustrated in FIG. 1 and then moved laterally so that the bolts 78 and 80 can be inserted into the holes 79 and 81 and the respective slots 70 and 72 in the positioning members 50 and 52. Then the wing nuts 90 and 92 would be replaced and tightened. This results in shorter pointed end portions 94 and 96 extending from the positioning members 50 and 52. In this configuration, the cutting tool 16 would be inserted into the opposite end of the guide member 46 from that illustrated in FIG. 1. This alternative configuration could allow easier access to the louvers 102 of the air filter grill 104 in certain confined situations.

As illustrated in FIG. 3, the outer surface 105 of the enlarged head portion 24 of the air filter sensor 12 has a visual indicator arm 106 that indicates when an air filter is satisfactory or when it is dirty or not good, and needs to be replaced. FIG. 4 also illustrates the centrally located circular cross section hole 32 that is present in the air filter sensor connecting and support member 14 for receiving the slender tubular portion 20 of the air filter sensor 12.

FIG. 5 illustrates how the air filter sensor 12 is installed so that it can sense the condition of an air filter that is designated by the number 108. As illustrated, the air filter 108 is located in a conventional manner adjacent to and in back of or behind an air filter grill 104 and its louvers 102. Some of these adjacently located louvers 102 have a circular shaped cross section hole 110 cut through them that is cut through the use of the previously discussed air filter grill cutting tool 16 and the associated air filter grill cutting tool guide 18. The air filter sensor connecting and support member 14 is located in the air filter grill 104 with its cylindrical circular cross section insert portion 30 being pressed into the hole 110 in the louvers 102 until its stop portion 34 rests upon the outside surface 112 of the louvers 102 adjacent to the hole 110.

As illustrated in FIG. 5, the slender tubular portion 20 of the air filter sensor 12 is inserted into the hole 32 in the air filter sensor connecting and support member 14 and the pointed end 22 is pushed through the air filter 108 so that the hole 26 in the tubular portion 20 is located on the opposite side of the air filter 108 then the air filter grill 104 and the enlarged head portion 24 rests upon the disk shaped stop portion 34 of the air filter sensor connecting and support member 14. As illustrated, in this position, the hole 28 in the enlarged head 24 of the air filter sensor 12 is located outside of the air filter grill and hence is exposed to the ambient or atmospheric air pressure. Portions of the tubular portion 20 of the air filter sensor 12 are broken away and illustrate that the tubular portion 20 is hollow and has a chamber 114 extending through most of its length.

Figure 6:
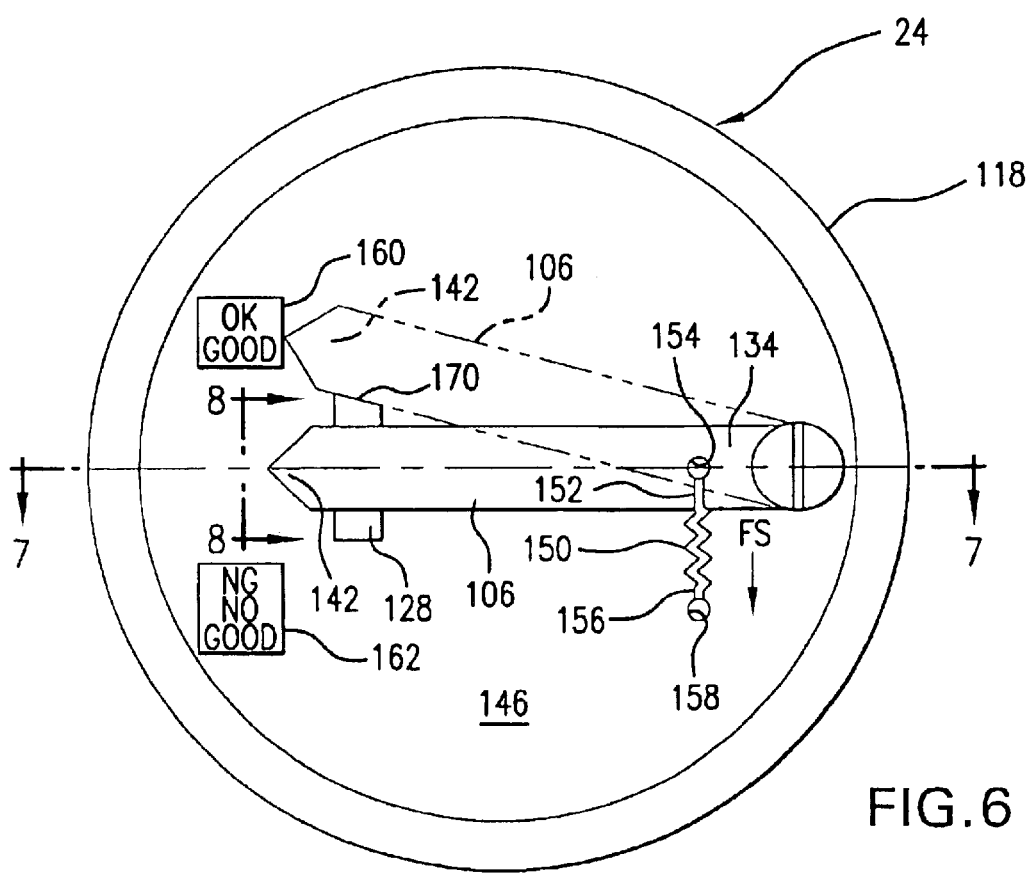
FIG. 6 is an enlarged view of the end elevational view of an air filter sensor illustrated in FIG. 3 with certain portions thereof broken away for clarity.
Figure 7:
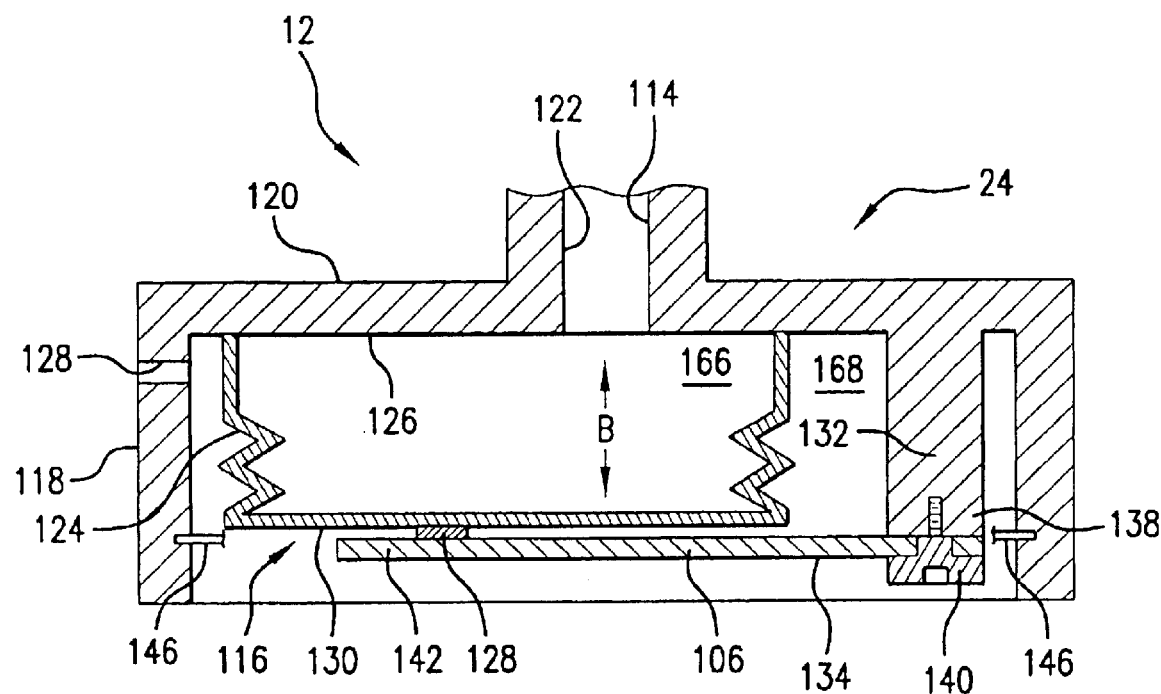
FIG. 7 is a sectional view of an air filter sensor structure illustrated in FIG. 6 taken on the line 7—7 thereof.
Figure 8:
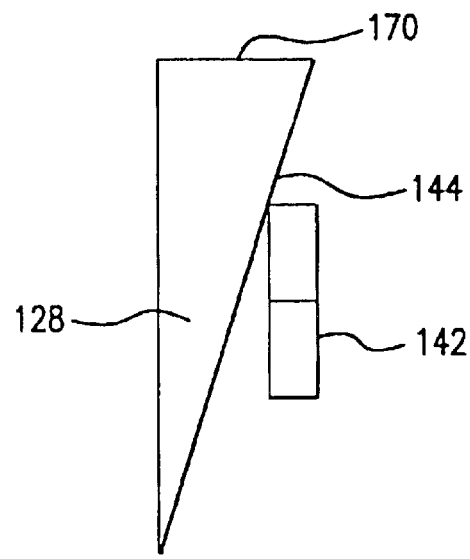
FIG. 8 is an enlarged side elevational view of a portion of the structure illustrated in FIG. 7 taken in the direction of the line 8—8 thereof.

FIGS. 6, 7 and 8 illustrate in detail the head portion 24 of the air filter sensor 12 and its pressure sensing means 116. As illustrated, the pressure sensing means 116 has a circular flat hollow housing 118 that forms part of the enlarged indicator portion 24. The flat rear housing wall 120 has an aperture 122 that is in fluid communication with the aperture or chamber 114 located in the elongated hollow slender tubular portion 20. The pressure sensing means 116 includes a hollow cylindrical shaped flexible bellows 124 that extends outward from the outer face or surface 126 of the flat rear wall 120 of the housing 118. A ramp member 128 that is part of the pressure sensing means 116 is secured to the outer surface 130 of the bellows 24.

A circular cross section projection 132 projects outward at a right angle from the outer surface 126 of the rear wall 120 of the housing 118. The inner end portion 134 of the elongated indicator arm 106 that is part of the pressure sensing means 116 is rotatably secured to the outer end portion 138 of the projection 132 by the shoulder screw 140. As indicated, the elongated indicator arm 106 is sufficiently long so that its outer end portion 142 can contact the sloping surface 144 of the ramp member 128 (see FIG. 8). A circular shaped flat faceplate 146 covers a substantial portion of the front portion of the housing 118.

As illustrated in FIG. 6, the indicator arm 106 is biased in a downward direction by a spring 150 that has one end portion 152 connected to a hole 154 in the inner end portion 134 of the indicator arm 106 and the other end portion 156 of the spring 150 is connected to a hole 158 in the faceplate 146. As indicated in FIG. 6, this spring 150 exerts a downward biasing force on the indicator arm 106 that is represented by the letter FS. The faceplate 146 has an OK or good indicator 160 and a NG or no good indicator 162 on its front surface. The housing 118 also has the atmosphere reference vent 28 in it. The arrows B in FIG. 7 indicate that the bellows 124 moves inward or outward in response to the differential in the pressure in the chamber 166 inside the bellows 124 and the chamber 168 formed by the housing 118 outside of the bellows 124.

To use the pressure sensing means 116, it is armed or set by moving the indicator arm 106 so that the outer end portion 142 is located on the OK position on the faceplate 146 as indicated in FIG. 6. In doing this, the indicator arm 106 is caused to slide up the inclined sloping surface 144 of the ramp member 128 stretching the spring 150 in the process until the indicator arm 106 clicks or moves into position on the upper flat side 170 of the ramp member 128 which holds the indicator arm 106 and prevents it from moving due to the spring 150 force FS. Then, as the blower runs, in time due to the filter 108 getting dirty, the air pressure on the inside of the bellows 124 becomes lower than the air pressure outside the bellows 124. This causes the bellows 124 to deflect toward the low pressure pressure or to collapse inward toward the surface 126. When the differential pressure becomes large enough and the bellows 124 deflates or collapses sufficiently, the indicator arm 106 slips past the upper flat side 170 of the ramp member 128 that is connected to the flat outer surface 130 of the bellows and the indicator arm 106 snaps to the NG position on the faceplate 146 due to the force FS of the spring 150.

As indicated in FIG. 5, when the pressure sensor 116 is installed it is exposed to both the ambient pressure through the hole 28 and the air pressure beyond or down stream from the filter 108 through the hole 26 near the point of the tubular portion 20. It will be noted that air flows in the direction of the arrow F and hence from the ambient air outside of the air filter grill 104 through the louvers 102 and then through the air filter 108. Consequently, when the air filter gets clogged with dirt and the like it restricts the passage of air and this results in the air pressure at the hole 26 being less than the air pressure at the hole 28 in the head portion 24 of the air filter sensor 12. This difference in pressure is sensed by the pressure sensing means 116 and causes the pressure sensing means 116 to operate in the previously indicated manner.

The air filter sensor apparatus kit 10 is used and method of the invention is practiced in the following manner. In order to use the invention initially, it is necessary to make a hole in the louvers 102 of the air filter grill 104. This is conveniently accomplished using the air filter sensor apparatus kit 10 that includes the previously described tool guide 18 and the air filter grill cutting tool 16. The user of the air filter sensor apparatus kit 10 selects a convenient location on the grill 104 and adjusts the tool guide 18 in the previously indicated manner so that it properly fits the louvers 102. Then the air filter grill cutting tool 16 is inserted into the guide hole 48 after it has been properly chucked into a standard hand drill (not shown). Then a hole 110 is drilled through the louver or louvers 102 with the cutting tool 16. Then the air filter sensor connecting and support member 14 is manually inserted into the resulting hole 110 in the louvers 102 of the air filter grill 104 in the previously indicated manner. Normally, the dirty air filter 108 is then removed if this had not been done previously and a new clean filter 108 installed in a conventional manner. Then the air filter grill 104, without the air filter sensor 12 but with the air filter sensor connecting and support member 14, is replaced in a conventional manner. Then the air filter sensor 12 is inserted into the air filter sensor connecting and support member 14 in the air filter grill 104 and in doing this the tubular portion 20 of the air filter sensor 12 is inserted into and through the new air filter 108.

After this, prior to operating the system (not shown) that uses the air filter 108, the user manually sets or arms or activates the air filter sensor 12 by setting the indicator arm 106 in the manner previously indicated in connection with FIGS. 6 through 8 by moving it upward along the sloping surface 144 of the ramp member 128 until it clicks into position on the upper flat side 170 of the ramp member 128 which holds it from moving due to the spring 150 force FS. Then, the system that uses the air filter 108 is operated and in time the air filter 108 will become clogged with dust and other particulate matter and this will cause a drop in the air pressure on the down wind side of the air filter 108. As previously indicated, in connection with FIGS. 6, 8 and 8, this drop in air pressure causes a drop in air pressure within the chamber 166 inside of the bellows 124.

When the pressure drop in the chamber 166 is sufficiently large due to a dirty air filter 108, the bellows 124 will collapse sufficiently so that its movable outer surface 130 and the connected ramp member 128 pulls away from the outer end portion 142 of the indicator arm 106 so that the outer end portion 142 of the indicator arm 106 is no longer held in place by the upper flat side 170 of the ramp member 128. When this occurs, the spring 150 pulls the indicator arm 106 downward so that its outer end portion 142 points to the NG or no good indicator 162 on the faceplate 146.

An important feature of the invention is that once the indicator arm 106 is in the position where its outer end portion 142 points to NG or the no good indicator 162 on the faceplate 146, it is maintained in that position by the force FS of the spring 150 until it is manually reset or armed. Consequently, the NG indication is maintained for visual observation even if the differential air pressure acting on the air filter sensor 12 changes or even becomes zero when the system is shut down or if the fan that causes air to pass through the filter 108 is turned off. Therefor, the user is always able to observe that the filter is not in good condition even if there is no power to the system that uses the air filter 108.

In order to properly use the sensor 12 of the invention, periodically the user will visually monitor the location of the outer end portion 142 of the indicator arm 106, and when the outer end portion 142 points to the NG indicator 162 on the faceplate 146, the user will know that the air filter 108 should be changed. When the outer end portion 142 of the indicator arm 106 is on NG, the user who notices that the outer end portion 142 of the indicator arm 106 has moved to this position first removes the air filter sensor 12 and then the air filter grill 104 with the connected the air filter sensor connector and support member 14 that is located in the hole in the air filter grill 104 in a conventional manner to expose the old air filter 108. The old air filter 108 is then manually removed and replaced with a new air filter 108. The air filter grill 104 along with the connected the air filter sensor connecting and support member 14 is then reinstalled. The user then manually inserts the air filter sensor 12 into the air filter sensor connector and support member 14 which results in the tubular portion 20 of the air filter sensor 12 with its sharp point 22 piercing the new air filter 108.

The user then manually arms or resets the indicator arm 106 in the manner previously indicated in connection with FIGS. 6 through 8 by moving it upward along the sloping surface 144 of the ramp member 128 until it clicks into position on the upper flat side 170 of the ramp member 128 which holds it from moving due to the spring 150 force FS. Then the system that uses the air filter 108 is restarted and operated in a conventional manner. This procedure associated with replacing the air filter 108 is then repeated each time that the user sees that the outer end portion 142 of the indicator arm 106 is on NG which indicates that the air filter sensor 12 has determined that the air filter 108 is dirty and needs to be replaced.

In view of the foregoing, the method of the invention for determining the need to change an air filter 108 and for changing the air filter 108 located behind an air filter grill 104 includes the following steps: providing a cutting tool 16, an air filter sensor 12 and an air filter sensor connecting and support member 14; using the cutting tool 16 to cut a hole 110 in the air filter grill 104 for a portion of the air filter sensor connecting and support member 14; inserting a portion of the air filter sensor connecting and support member 14 in the hole 110 in the air filter grill 104; locating an air filter 108 in place behind the air filter grill 104; inserting the air filter sensor 12 through the hole 32 in the air filter sensor connecting and support member 14 in the air filter grill 104 and through the air filter 108; arming or activating the air filter sensor 12; exposing the air filter 108 to particulate matter while operating the system using the air filter 108; monitoring the air filter sensor 12 for an indication from the air filter sensor 12 when the air filter 108 is dirty and needs to be changed; and changing the air filter 108 when the air filter sensor 12 provides an indication when air filter 108 is dirty.

The method of the invention for determining the need to change an air filter and for changing the air filter 108 located behind an air filter grill 104 can also include providing a cutting tool guide 46 in addition to the cutting tool 16 and using the cutting tool guide 46 to orient the cutting tool 16 with respect to the air filter grill 104 during the step of using the cutting tool 16 to cut a hole 110 in the air filter grill 104 for a portion of the air filter sensor connecting and support member 14.

The method of the invention for determining the need to change an air filter and for changing the air filter 108 located behind an air filter grill 104 also includes manually resetting the air filter sensor 12 after the air filter sensor 12 has given an indication that the air filter 108 is dirty and the dirty air filter 108 has been replaced with a clean air filter 108.

The method of the invention for determining the need to change an air filter and for changing the air filter 108 located behind an air filter grill 104 also includes removing the elongated hollow slender tubular portion 20 of the air filter sensor 12 from the hole 32 in the air filter connecting and support member 14 for servicing or replacement of the air filter sensor 12 whenever the air filter sensor 12 becomes defective.

Although the invention has been described in considerable detail with reference to a certain preferred embodiment, it will be understood that variations or modifications may be made within the spirit and scope of the invention as defined in the appended claims.

What is claimed is:

1. An air filter sensor kit for permitting a person to modify the filtering portion of a heating or cooling system having an existing air filter duct grill with an exterior exposed to ambient air pressure and an associated air filter with two sides located adjacent to and behind said existing air filter duct grill to enable the determination of when the air filter is dirty and needs changing for use in conjunction with a hole formed through said existing air filter duct grill comprising an air filter sensor for sensing differential air pressure caused by said air filter located adjacent to and behind said existing air filter duct grill becoming dirty, said air filter sensor having a portion thereof sized and shaped to be inserted through said air filter located adjacent to and behind said existing air filter grill and having an indicator portion adapted to be located on the exterior of said existing air filter duct grill with indicating means for providing an indication of the differential air pressure sensed by said air filter sensor, said air filter sensor having sensing means for sensing the difference in air pressure between the ambient air pressure at the exterior of said existing air filter duct grill and the air pressure located on the opposite side of said air filter than said existing air filter duct grill, and air filter sensor connecting and support means for connecting said filter sensor to said existing air filter duct grill and for providing support for said air filter sensor, said air filter sensor connecting and support means being sized and shaped to be inserted into the hole formed through said existing air filter duct grill.

2. The air filter sensor kit of claim 1 further comprising means for assisting in forming the hole through said existing air filter duct grill to permit the passage of a portion of said air filter sensor and a portion of said air filter sensor connecting and support means through said existing air filter duct grill.

3. The air filter sensor kit of claim 2 wherein said means for assisting in forming the hole through said existing air filter duct grill comprises a cutting tool.

4. The air filter sensor kit of claim 2 wherein said means for assisting in forming the hole through said existing air filter duct grill comprises a cutting tool guide and positioner for use with a cutting tool.

5. The air filter sensor kit of claim 4 wherein said cutting tool guide and positioner has means for conforming to the exterior of said existing air filter duct grill.

6. The air filter sensor kit of claim 5 wherein said cutting tool guide and positioner has means for conforming to different exteriors of said existing air filter duct grill.

7. The air filter sensor kit of claim 6 wherein the exterior of said existing air filter duct grill has louvers and said cutting tool guide and positioner has means for conforming to different louvers of said existing air filter duct grill.

8. The air filter sensor kit of claim 7 wherein said different louvers have different spacing and wherein said cutting tool guide and positioner has means for conforming to the different spacing of the different louvers of said existing air filter duct grill.

9. The air filter sensor kit of claim 8 wherein said different louvers have different slopes and wherein said cutting tool guide and positioner has means for conforming to the different slopes of the different louvers of said existing air filter duct grill.

10. The air filter sensor kit of claim 1 wherein said sensing means for sensing the difference in air pressure between the ambient air pressure at the exterior of said existing air filter duct grill and the air pressure located on the opposite side of said air filter than said existing air filter duct grill includes a hole in the portion of said air filter sensor sized and shaped to be inserted through said air filter positioned to be located on the opposite side of said air filter than the existing air filter duct grill when said air filter sensor is installed.

11. The air filter sensor kit of claim 10 wherein said sensing means for sensing the difference in air pressure between the ambient air pressure at the exterior of said existing air filter duct grill and the air pressure located on the opposite side of said air filter than said existing air filter duct grill includes a hole in said air filter sensor positioned to be located on the outside of said existing air filter duct grill when said air filter sensor is installed.

12. The air filter sensor kit of claim 1 wherein the portion of said air filter sensor sized and shaped to be inserted through said air filter comprises an elongated tubular portion with an end portion and wherein the end portion is pointed.

13. The air filter sensor kit of claim 1 wherein said air filter sensor connecting and support means comprises a resilient flexible member.

14. The air filter sensor kit of claim 1 wherein said indicating means of the indicator portion of said air filter sensor has means for providing an indication when the sensed differential air pressure indicates said air filter is dirty and should be replaced.

15. The air filter sensor kit of claim 14 wherein said means for providing an indication when the sensed differential air pressure indicates said air filter is dirty and should be replaced has means for continuing to provide such indication once said air filter sensor is exposed to the differential air pressure caused by a dirty air filter which should be replaced.

16. The air filter sensor kit of claim 1 wherein said indicating means for providing an indication of the differential air pressure sensed by said air filter sensor is manually set or armed.

17. The air filter sensor kit of claim 16 wherein said indicating means for providing an indication of the differential air pressure sensed by said air filter sensor includes a movable surface.

18. The air filter sensor kit of claim 17 wherein said movable surface forms part of a bellows.

19. The air filter sensor kit of claim 18 wherein said indicating means for providing an indication of the differential air pressure sensed by said air filter sensor includes an indicator arm associated with said movable surface.

20. A method for permitting a person to modify the filtering portion of a heating or cooling system having an existing air filter duct grill to determine the need to change an air filter located behind said existing air filter duct grill comprising:

1. providing a cutting tool, an air filter sensor with means for indicating when an air filter located behind the existing air filter duct grill should be replaced, and an air filter sensor connecting and support member,
2. using said cutting tool to cut a hole in said existing air filter duct grill for a portion of said air filter sensor connecting and support member,
3. inserting the a portion of said air filter sensor connecting and support member in the hole in said existing air filter duct grill,
4. inserting said air filter sensor through said air filter sensor connecting and support member in said existing air filter duct grill and through said air filter,
5. exposing said air filter to particulate matter while operating said system using said air filter, and
6. monitoring said air filter sensor for an indication from said air filter sensor when said air filter should be replaced.

* * * * *